US012762880B2

(12) United States Patent
Singh Thapa et al.

(10) Patent No.: US 12,762,880 B2
(45) Date of Patent: Oct. 13, 2026

(54) SYSTEM FOR ONLINE COURSE CREATION

(71) Applicant: Fusemachines Inc., New York, NY (US)

(72) Inventors: Mahendra Singh Thapa, Kathmandu (NP); Miran Ghimire, Kathmandu (NP); Rakesh Kumar Katuwal, Kathmandu (NP); Suresh Manandhar, Kathmandu (NP); Sameer Maskey, New York, NY (US)

(73) Assignee: Fusemachines Inc., New York, NY (US)

( * ) Notice: Subject to any disclaimer, the term of this patent is extended or adjusted under 35 U.S.C. 154(b) by 101 days.

(21) Appl. No.: 18/599,106

(22) Filed: Mar. 7, 2024

(65) Prior Publication Data

US 2025/0037493 A1 Jan. 30, 2025

Related U.S. Application Data

(60) Provisional application No. 63/450,529, filed on Mar. 7, 2023.

(51) Int. Cl.
*G06V 30/413* (2022.01)
*G06Q 50/20* (2012.01)
*G06V 30/10* (2022.01)

(52) U.S. Cl.
CPC ......... *G06V 30/413* (2022.01); *G06Q 50/205* (2013.01); *G06V 30/10* (2022.01)

(58) Field of Classification Search
None
See application file for complete search history.

(56) References Cited

U.S. PATENT DOCUMENTS

| | | | |
|---|---|---|---|
| 11,645,935 | B1 | 5/2023 | Smetters |
| 2006/0216683 | A1 | 9/2006 | Goradia |
| 2010/0273138 | A1 | 10/2010 | Edmonds et al. |
| 2013/0096892 | A1 | 4/2013 | Essa |

(Continued)

FOREIGN PATENT DOCUMENTS

| | | | |
|---|---|---|---|
| CN | 115662216 | A * | 1/2023 |
| EP | 4235546 | A1 | 8/2023 |
| KR | 20210158466 | A | 12/2021 |

OTHER PUBLICATIONS

"Classification of Documents Extracted from Images with Optical Character Recognition Methods"; AYDIN; Anatolian Journal of Computer Sciences; vol. 6, No. 2; pp. 46-55; 2021. (Year: 2021).*

(Continued)

*Primary Examiner* — David Ometz
(74) *Attorney, Agent, or Firm* — Polsinelli LLP

(57) ABSTRACT

Systems and methods are provided for custom online course based on matching content with a course syllabus by parsing a syllabus document submitted by a teacher into course segments and matches course resources with appropriate course segments. The course segments can be automatically placed into an online course structure. The appropriate course materials can then be automatically matched to each course segment. Teachers may then approve, edit, or delete course segments and their matched materials. This approval process may improve the syllabus parsing and content matching and content generation using machine-learning models, such as large language models.

20 Claims, 7 Drawing Sheets

(56) References Cited

U.S. PATENT DOCUMENTS

| | | | |
|---|---|---|---|
| 2013/0224699 A1 | 8/2013 | Jastrzembski | |
| 2015/0100303 A1 | 4/2015 | Danson | |
| 2016/0140859 A1 | 5/2016 | Jiao et al. | |
| 2016/0189046 A1 | 6/2016 | Byron et al. | |
| 2017/0069327 A1 | 3/2017 | Heigold et al. | |
| 2018/0218627 A1 | 8/2018 | Smith Lewis et al. | |
| 2019/0080627 A1 | 3/2019 | Dey et al. | |
| 2020/0051451 A1 | 2/2020 | Goyal et al. | |
| 2020/0160231 A1 | 5/2020 | Asthana et al. | |
| 2021/0049923 A1* | 2/2021 | Brinton | G09B 7/00 |
| 2021/0304339 A1 | 9/2021 | Neelakanta | |
| 2021/0358317 A1 | 11/2021 | Faldu et al. | |
| 2021/0390872 A1 | 12/2021 | Lynch | |
| 2021/0398439 A1 | 12/2021 | Li | |
| 2022/0114900 A1* | 4/2022 | Qiu | G06N 3/08 |
| 2022/0392226 A1 | 12/2022 | Li et al. | |
| 2022/0392368 A1 | 12/2022 | Hall | |
| 2023/0274377 A1 | 8/2023 | Kulshrestha et al. | |
| 2023/0289909 A1 | 9/2023 | Chang | |
| 2023/0320642 A1 | 10/2023 | Lin | |
| 2024/0386319 A1 | 11/2024 | Yamamoto | |
| 2024/0394817 A1 | 11/2024 | Issac | |
| 2025/0078513 A1 | 3/2025 | Khadka et al. | |
| 2025/0139173 A1 | 5/2025 | Prajapati et al. | |
| 2025/0173804 A1 | 5/2025 | Gautam et al. | |

OTHER PUBLICATIONS

U.S. Appl. No. 18/599,110, Non-Final Office Action dated Mar. 9, 2026.

U.S. Appl. No. 18/732,212, Non-Final Office Action dated Jun. 25, 2025.

U.S. Appl. No. 18/732,212, Final Office Action dated Jan. 15, 2026.

U.S. Appl. No. 18/732,238, Non-Final Office Action dated Nov. 19, 2025.

U.S. Appl. No. 18/732,238, Final Office Action dated Jul. 16, 2026.

* cited by examiner

SYSTEM FOR ONLINE COURSE CREATION

CROSS-REFERENCE TO RELATED APPLICATIONS

This application claims priority from U.S. provisional application 63/450,529 filed Mar. 7, 2023, the disclosure of which is incorporated herein by reference.

FIELD OF THE DISCLOSURE

The present disclosure is generally related to custom online learning systems and the creation of custom courses for online learning systems.

DESCRIPTION OF THE RELATED ART

Online learning poses many challenges to students, including staying motivated, technical issues, distractions, time management, and understanding course expectations. To that end, teachers of online courses must provide students with clear expectations, timelines, and technical mechanisms necessary to succeed in the course. A great challenge is linked to students' learning environment at home, while their least challenge was technological literacy and competency. Further, each student may face different challenges, and presently available online learning content and tools may be static and not adapted to the individual needs to each student.

Therefore, it is desirable to have a way to collect syllabus information from teachers of online courses in a wide variety of formats and use that data to structure a customized online course and provide each students with the appropriate set of resources to overcome their individual online learning issues for each portion of the course.

SUMMARY OF THE CLAIMED INVENTION

Embodiments of the present invention include systems and methods for custom online course based on matching content and generating content with a course syllabus by parsing electronic documents including syllabus data as submitted by a teacher for online course segments and matching course resources with appropriate course segments and student characteristics. The course segments can be automatically placed into an online course structure. The appropriate course materials can then be automatically matched to each course segment. Teachers may then approve, edit, or delete course segments and their matched materials. This approval process may improve the syllabus parsing and content matching and content generation using machine-learning models, such as large language models.

BRIEF DESCRIPTIONS OF THE DRAWINGS

DETAILED DESCRIPTION

Embodiments of the present disclosure will be described more fully hereinafter with reference to the accompanying drawings in which like numerals represent like elements throughout the several figures and in which example embodiments are shown. Embodiments of the claims may, however, be embodied in many different forms and should not be construed as limited to the embodiments set forth herein. The examples set forth herein are non-limiting examples and are merely examples among other possible examples.

The course syllabus is the contract between the course instructor and the enrolled students and provides great detail of attention to course features such as, a number of examinations and quizzes, grading procedures and policies, kind of assignments, and examination and quiz dates. Furthermore, it also acts as a guidebook for any course providing information about various aspects of course such as learning objectives, assignment dates, homework schedule, topics list, and links to reference materials such as books or publications. The course outline mentioned in the syllabus document provides information about the collection of concepts that will be covered during the course tenure. The course outline can be in the hierarchical format, which can be mapped as topic, sub-topic, sub-subtopic, etc. A well-structured course syllabus can help students overcome many of the challenges found in online learning.

Figure 1:
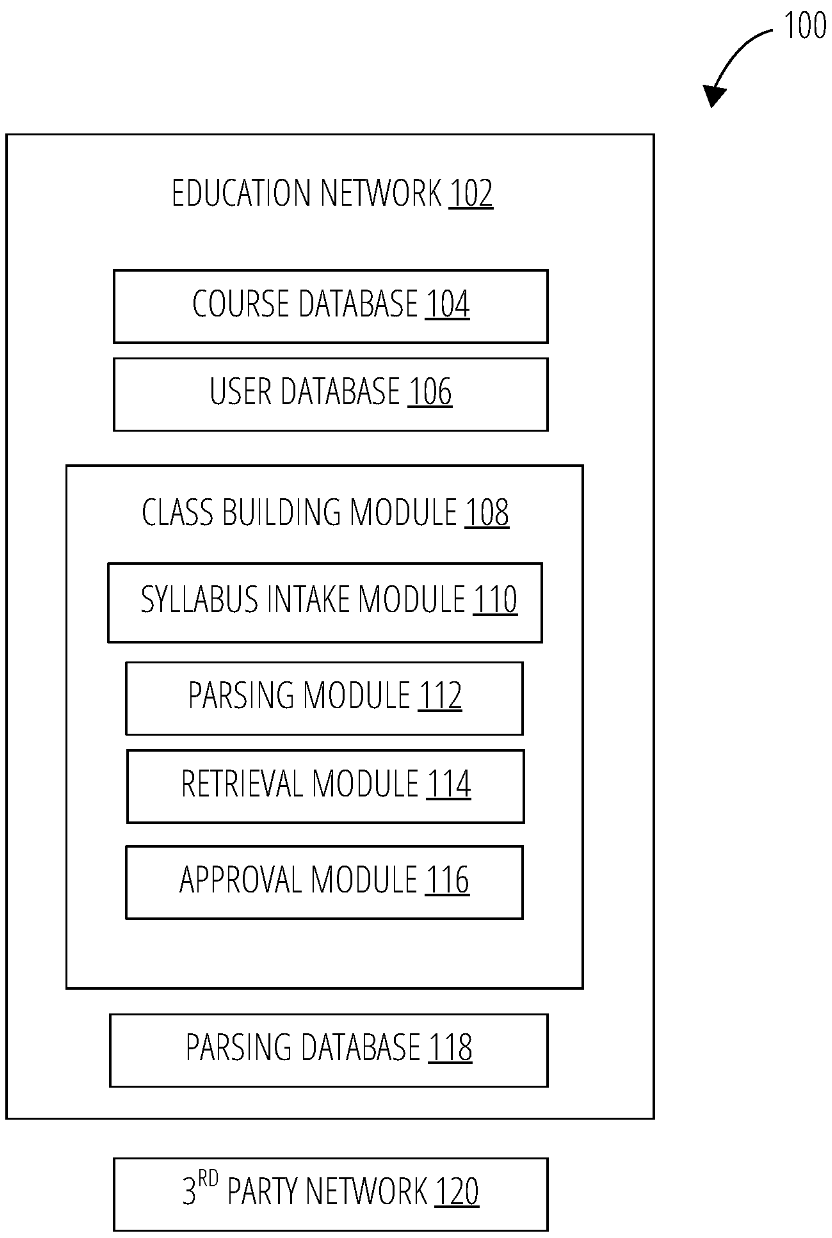
FIG. 1 illustrates an example system for online course construction.

FIG. 1 illustrates an example system 100 for online course construction. The example system 100 may comprise an education network 102, which may allow users to take one or more courses online. The present invention allows teachers to create courses by providing the education network 102 with a syllabus. Further, the example system 100 may include a course database 104, which may store all available courses, along with their course details. Course details may include several course segments, class topics, subtopics, tests, quizzes, and resources. Resources may include textbooks, learning tools, and other relevant supporting materials. Further, the example system 100 may include a user database 106, which may store information related to users of the education network 102. Users may be students or teachers. Information related to users may include which courses they are associated with, their grades, attendance, engagement metrics, accessibility needs, etc. Such information may further be used to tailor the presentation of course content so as to facilitate individual learning.

Further, the example system 100 may include a class building module 108, which may allow teachers to create custom courses and record the details in the course database 104. Through the class building module 108, a teacher may define the number of course segments in a course, the segment topics and subtopics, quizzes, tests, assessments, and relevant course materials such as textbooks, videos, and relevant web links. Teachers may input course information through the syllabus intake module 110. The syllabus intake module 110 may allow teachers to submit a syllabus document to be read. If the teacher submits a syllabus document, a parsing module 112 may be prompted. In one embodiment, the syllabus may be in the form of a PDF document. In some cases, extracted text blocks from PDF-formatted full-text research articles may be classified them into logical units based on handcrafted rules that characterize specific sections.

In some cases, the syllabus intake module 110 may incorporate a rule-based text classification algorithm that follows a multi-pass sieve framework that automatically classifies PDF text snippets into, for example, a title, abstract, body text, semi-structured, and metadata categories. An iterative window-based approach is used to extract the course outline from syllabus PDF. In some aspects, relevant information is extracted once the desired blocks from the PDF document are segmented. Each text segment block is classified into some categories with a rule-based system, and additionally, concept text is identified within the course outline, and the topic, subtopic, or sub-subtopic relation between them are inferred. Using a Metropolis-Hasting algorithm, an unsupervised approach to jointly identify the key concept from syllabus with the pool of manually collected predefined concepts and identify the prerequisite relationship between the same task has also been explored with another unsupervised approach as a constraint satisfaction problem in recovering concepts relationships where the concept is extracted using artificial intelligence.

In some cases, the two tasks separately use a regex-based system to identify the concept instead of relying on a pool of predefined concepts and an infinite mixture model to cluster and infer the topic, subtopic, and sub-subtopic relation between the concepts. The regex-based system may be a system that utilizes regular expressions (regex) to process and manipulate text data. Regular expressions are sequences of characters that define a search pattern, used for matching and manipulating strings.

Besides, supervised learning and active learning has also been used to identify the prerequisite relation between the concepts. In some cases, the textual and visual features are used for information extraction in a supervised setting. In some cases, it follows an unsupervised paradigm for the task. Deep learning-based Named Entity Recognition methods may rely on textual information. In some cases, direct text-based classification into the topic, subtopic, or sub-subtopic wouldn't work because of the inherent ambiguity in the text-level information, as one concept could probably appear in all of the settings.

Instead, classification of the current concept into its respective category may rely heavily upon the visual cues of the surrounding concept alongside textual cues. In one embodiment, an algorithm can leverage the visual cues and textual cues to extract the course outline from the syllabus PDF document and categorize them into a topic, subtopic, or sub-subtopic. The task of course outline extraction from given syllabus PDF documents and mapping the extracted course outline text into "topic," "subtopic," and "sub-sub-topic" is achieved by combining visual and textual cues. In some cases, that process may involve five steps: table detection, table cell detection, table text extraction, syllabus table detection, topic list format extractor, and topic table format extractor. The syllabus PDF document is converted into an image using python pdf2image package with table detection. After that, the image is passed to a Mask-RCNN based model pre-trained with the PubLayNet dataset using Detectron2. The table and list label bounding box may be used for table detection in the syllabus PDF documents out of title, text, figure, table, and list label. For cell detection, the objective is to detect the bounding box of the table cell.

At first, table images containing vertical and horizontal lines are obtained by performing color inversion, erosion, and dilation. Then contour detection is used in the image containing only horizontal and vertical lines to extract the bounding box of each table cell. For table text extraction, the text corresponding to each table cell is retrieved using bounding box information for each table cell and python pdftotext package to create a fully digital table. To identify whether the table is a syllabus table or not, each of the table's column headers is compared with a regex-based system. If matches are found, then it is regarded as a syllabus table. Sometimes there may occur multiple syllabus tables.

In that case, the syllabus with the largest area is taken as the final syllabus table and ignored. Topic list format extracting consists of six steps: detecting the start and end of the course outline, candidate extraction, removing other list formats, cluster assignments, cluster post-processing, and cluster labeling. In detecting the start and end of the course outline: a regex-based system is used to identify the potential head start of the course outline section. To identify the end, an iterative window-based algorithm is used. Candidate extraction is used to extract the text from the detected course outline section using the regex-based system. Along with current text, the start line, end line, indentation level, prefix type, and prefix value are extracted. They are defined as:

Start Line: Line number in which text occurs.

End Line: Line number in which text end.

Indentation Level: Number of white spaces from the left side till the first character of the text.

Feature Value: Actual text.

Prefix Type: Type of prefix that exists before extracting text.

Prefix Value: Exact value of prefix type.

The next step is to remove other list formats. During the text extraction from the course outline section using candidate extraction, it was observed that three of the other list formats: readings, assignments, and learning objectives were recurring frequently. The next step is cluster assignment, during which soft clustering of the text is done based on its feature using Infinite Mixture Model with Chinese Restaurant Process (CRP). In some cases, distance metrics are used to measure the dissimilarity between two text blocks represented by their feature value.

This may be done with a Gaussian function which takes general density distribution as an input parameter to measure how well text fits into an assigned cluster by averaging the similarity between the current text and all the text that belongs to that cluster. Cluster post-processing involves two operations. The first operation is to merge clusters based on similarity. To compute the similarity of two clusters, the similarity of one element may be compared with all of the elements in another cluster, and the results averaged out. Clusters above a similarity threshold may be merged. Clusters are then labeled in a sequence of topic, sub-topic, and sub-sub-topic based on the ascending order of the smallest start line of each text cluster.

In some cases, a topic table format extractor may then be used once the text has been identified as a syllabus table. It consists of two steps: noise removal and topic, sub-topic, and sub-sub-topic assignment. After removing recurring noise patterns, the candidate extraction pipeline is applied to the course outline column obtained from the syllabus table. If candidate extraction can extract the text from the course outline column, then cluster assignment, cluster post-processing, and cluster labeling steps, as mentioned previously, are performed.

Further, the example system 100 may include a retrieval module 114, which may retrieve course materials for the identified course segments from either course materials provided by the teacher to the course database 104 or from a third party database 122. For example, the teacher may provide the textbook to the course database 104, and an instructional video may be retrieved from the Internet. The retrieval module 114 may then identify portions of course materials that are to be linked to class topics, sub-topics, and sub-sub-topics. Further, the example system 100 may include an approval module 116, which may present how the course has been segmented, and the course materials matched to course segments for the teacher to approve or decline. This process may also serve as feedback to the machine-learning model that parses the syllabus or matches course materials.

Further, the example system 100 may include a parsing database 118, which may store syllabus documents submitted through the syllabus intake module 110 for processing by the parsing module 112. Further, the example system 100 may be connected to one or more third party networks 120. Third party networks 120 may be a source of course materials. For example, the course textbook may be hosted on a website from which the relevant chapters may be downloaded, or instructional videos may be hosted by a third party network 120.

As such, a syllabus may have a first organizational outline whereas the parsed course segments may end up having a different organizational flow. Additionally, the supporting course material may also have a different organizational outline, such that the parsed course segment along with the matched course material content form a custom online course, not only in organizational flow but also in content. As such, the example system 100 may expand the syllabus with content generated by a machine-learning model, such as a large language model that uses the parsed course segments and the matched course material content to include other relevant course segments and/or content. The content may include video, text or both either generated using generative models and/or matched from the Internet. Additionally, content may include reading materials, coding materials, quizzes etc.

Figure 2:
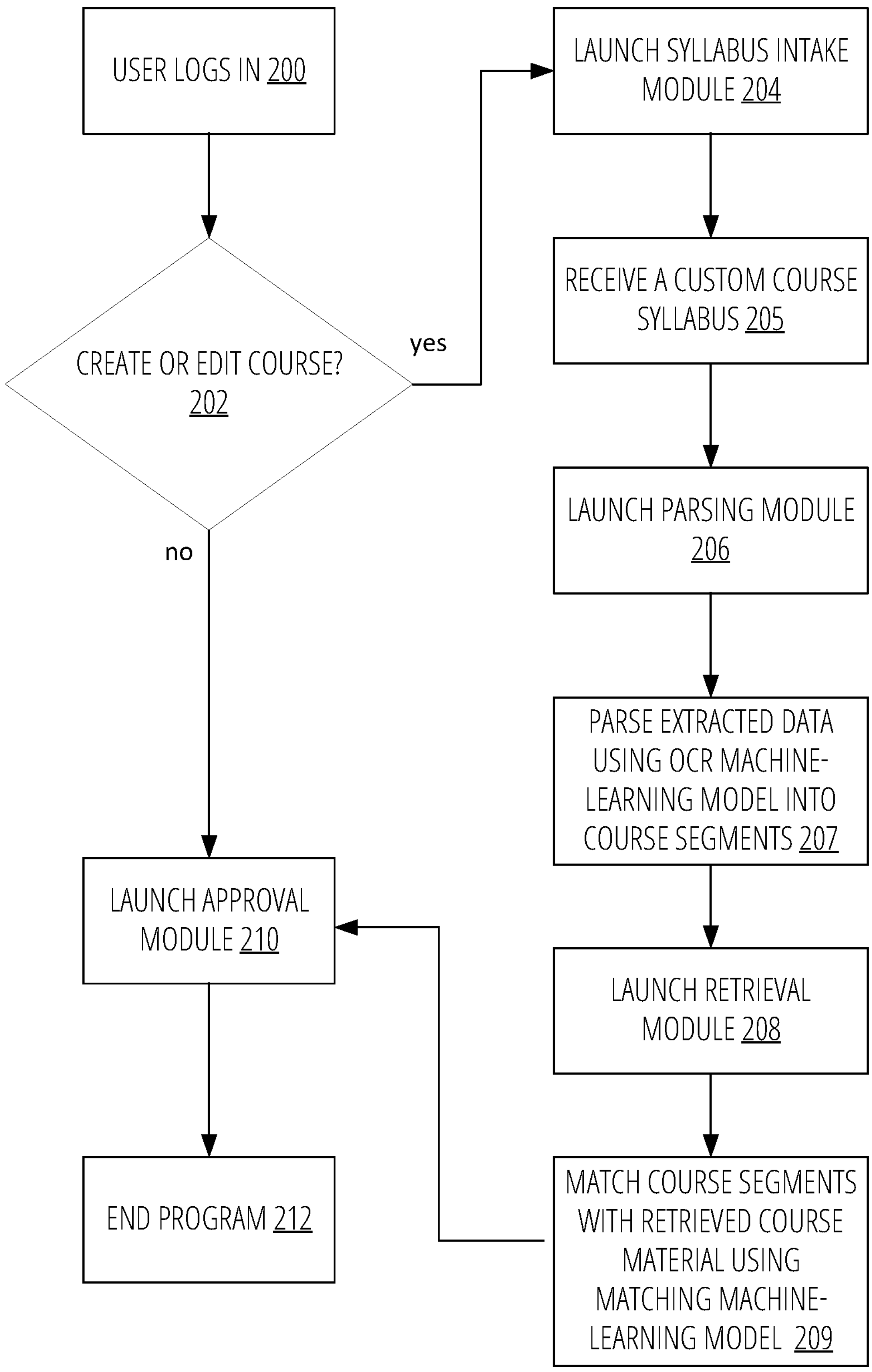
FIG. 2 illustrates an example process of a class building module.

FIG. 2 illustrates an example process of the class building module 108. The process begins with a user whose access level in the user database 106 includes course creation rights logging into the class building module 108, at step 200. It may then be determined if the user wants to create a new course or edit an existing course at step 202. If the user is creating a new course or editing an existing course, the syllabus intake module 110 is launched at step 204. Once the syllabus intake module 110 has finished, the parsing module 112 is launched at step 206. Once the parsing module 112 has finished, the retrieval module 114 is launched at step 208. Once the retrieval module 114 has finished, the approval module 116 is launched at step 210. If the user elects not to create or edit a course at step 202, the system may launch the approval module 116 if the user has one or more course segments or course materials that have not been approved. Once the user has no more material to add or approve, the program ends at step 212.

Figure 3:
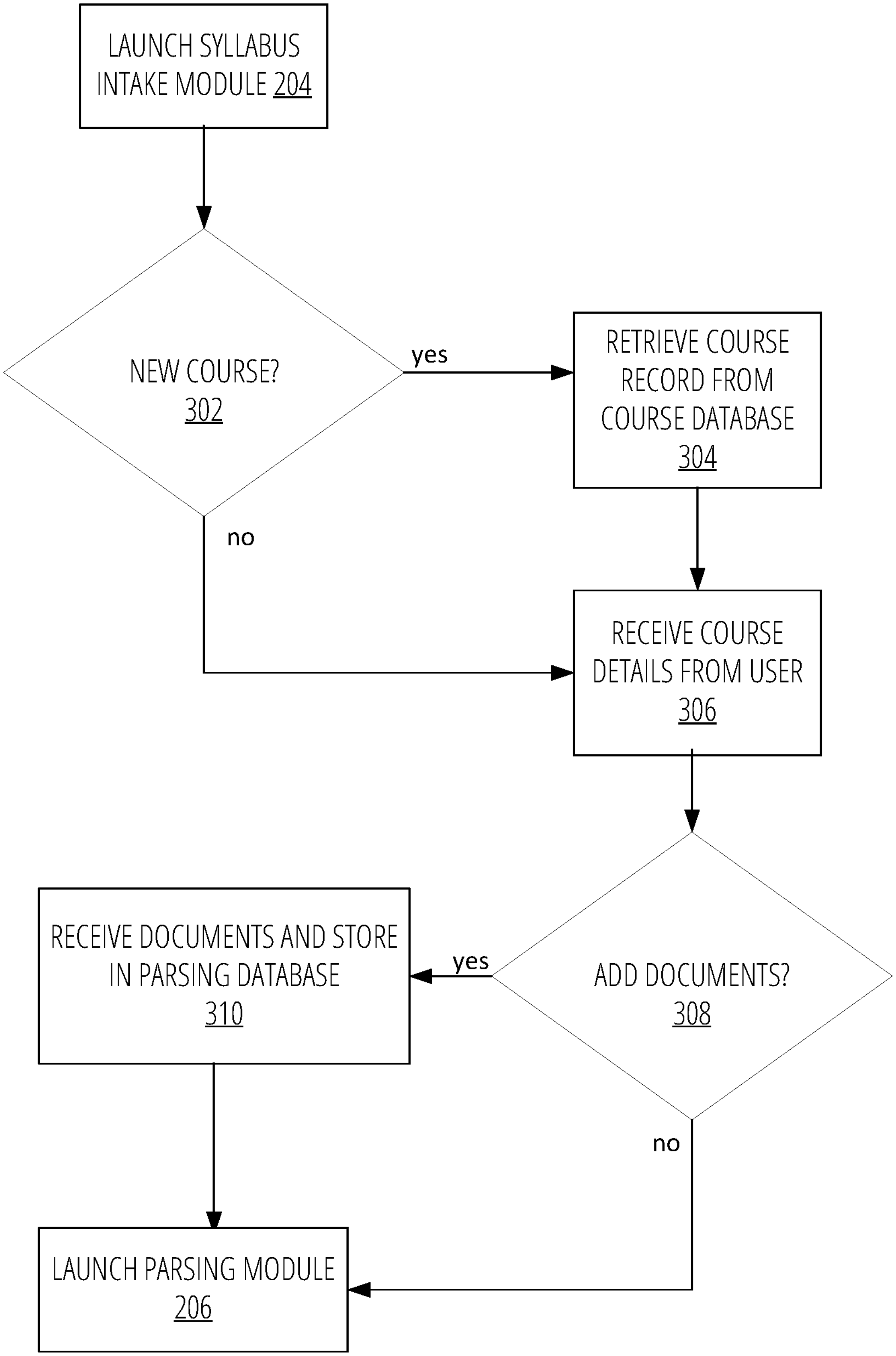
FIG. 3 illustrates an example process of a syllabus intake module.

FIG. 3 illustrates an example process of the syllabus intake module 110. The process begins with the syllabus intake module 110 receiving a prompt from the class building module 108, at step 300. It may be determined at step 302 if the user wants to create a new course or edit an existing course. If the user indicated at step 302 that they want to edit an existing course, the course data may be retrieved from the course database 104 at step 304. After the existing course is retrieved at step 306, or the user has indicated they want to create a new course, the new course details may be received from the user at step 306. Course details may include but are not limited to course title, reference books, dates, times, etc. It may then be determined, at step 308, if the user has any documents related to the course, such as a syllabus. If it is determined that the user has documents related to the course, those documents may be received and stored in the parsing database 118, at step 310. For example, the user may have created a syllabus as an outlined word document. That document may be uploaded as an electronic file or scanned in, and the scanned image may be stored in the parsing database 118. If the user has multiple documents to add, the process may return to step 308. Once all documents have been uploaded to the parsing database 118, the process returns to the class building module 108, at step 312.

Figure 4:
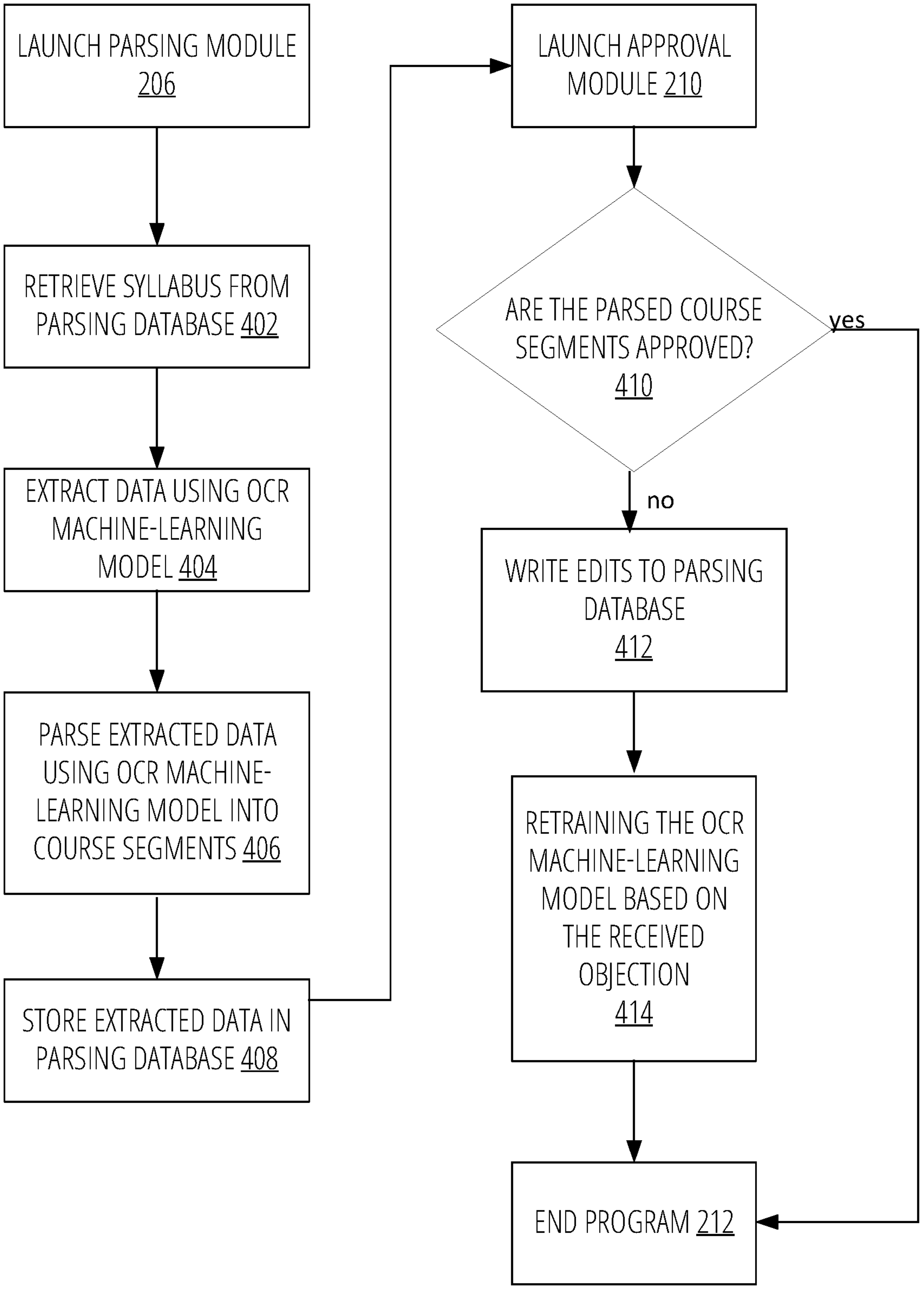
FIG. 4 illustrates an example process of a parsing module interfacing an example approval module.

FIG. 4 illustrates an example process of the parsing module 112 interfacing an example approval module. The process begins with the launching of the parsing module at step 206. In some cases, the parsing module 112 may receive a prompt from the class building module 108 at step 400. In some case, the prompt may be an uploaded syllabus. The syllabus may be uploaded by the teacher through the syllabus intake module 110 and may be retrieved at step 402 from the parsing database 118. The syllabus, which may be a word processing document, a PDF document, or a scanned handwritten document, images, etc., may have data extracted at step 404 through an optical character recognition (OCR) or other similar methods for parsing data from documents.

One type of parsing involves the identification of regular expressions, a sequence of characters that specifies a search pattern, in a document and utilizing a group of regular expressions to define a regular language which a regular expression engine may then use to generate a parser for that language. In some cases, an optical character recognition (OCR) machine-learning model applies machine-learning to large publicly available databases to achieve high levels of accuracy. This practice may allow the OCR machine-learning model to handle noisy documents with inconsistent inking, spacing, alignment, etc., and support multilingual documents. A combination of parsing tools may be used in some embodiments, such as using natural language processing in conjunction with OCR.

The extracted data may then be parsed at step 406. There are many ways known in the art for parsing the extracted data. The parsing module 112 may include an OCR machine-learning model with a rules-based approach, which may be used for structured documents. However, in some cases a user may need to define a template of the document which may be used as a reference to extract data from the document. However, as such, a major disadvantage of using rule-based data parsing approaches is the strict reliance on predefined templates.

Merely relying on rule-based matching without machine-learning may fail if the document uses a slightly different format than the one defined in the template. In some cases, the parsing module 112 may include the OCR machine-learning model that utilizes model or learning-based approaches trained on a diverse set of unstructured documents. In some cases, the OCR machine-learning model determines weights based on parsed training data including parsed course segment text associated with determined course segments. This type of process relies heavily on machine-learning and natural language processing. In some cases, the OCR system may utilize machine-learning systems such as long-short-term memory (LSTMs), which are great at learning sequences but slow down when the number of states is too large.

In some cases, the OCR machine-learning model may include a LSTM network that learns long-term dependencies. In other words, the LSTM may be trained to understand and predict patterns in data sequences that are lengthy or extend over a significant number of time steps. As such, the OCR machine-learning model may function as a multi-stage process that includes a word-finding stage, a line finding stage, and a character classification stage with a LSTM. The word finding stage may be by organizing text lines into blobs, and the lines and regions are analyzed for fixed pitch or proportional text. Text lines are broken into words differently according to the kind of character spacing. Recognition then proceeds as a two-pass process. An attempt is made to recognize each word in turn in the first pass. Each satisfactory word is passed to an adaptive classifier as training data. The adaptive classifier then gets a chance to recognize text lower down the page more accurately. Adding new data to the training tool of the OCR machine-learning model may allow the model to be trained with a lot of data and fonts to improve recognition accuracy. In some cases, objections to a parsing of course segments may be used to retrain the OCR machine-learning model by adjusting the weights to align with the received objection.

In practice, combining rule-based and model-based approaches will provide more accurate parsing. The extracted and parsed data may be stored in the parsing database 118, at step 408. For example, a syllabus may be presented for a geometry course. The first level of an outline may contain the phrase "The classification of angles" and have sub-bullets that include "Supplementary and Complementary Angles." "The Classification of Angles" may be defined as a course segment based on its position in the syllabus outline, while "Supplementary and Complementary Angles" may be defined as a sub-topic of that course segment due to its content and position relative to the identified course segment.

The process may proceed to the approval module 116 by launching the approval module 116 at step 210. The approval module 116 may proceed to determine whether there are parsed course segments that the teacher has not yet approved at step 410. The course segments may be parsed from a syllabus document by the parsing module 112. The teacher may then either approve or disapprove the parsed course segments. If the teacher approves of one parsed course segment and there are more parsed course segments, the teacher may continue to approve or disapprove the parsed course segments, until there are no more and ending the program at step 212. If the teacher does not approve the parsed course segment, they may elect to edit or delete the segment at step 412, and the edits may be written to the parsing database 118. Furthermore, the OCR machine-learning model may be retrained based on the received objection in step 414.

Figure 5:
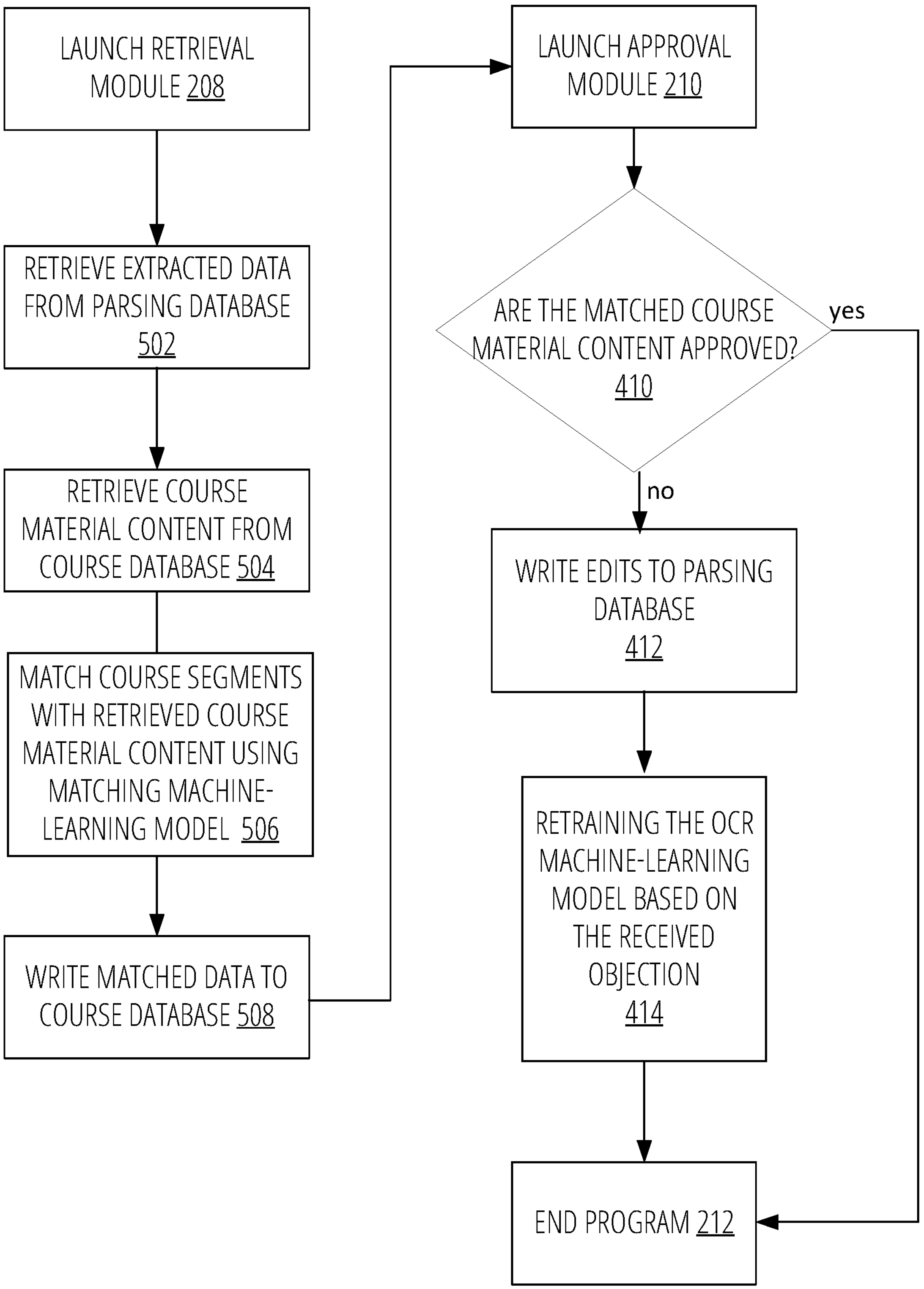
FIG. 5 illustrates an example process of a retrieval module interfacing an example approval module.

FIG. 5 illustrates an example process of the retrieval module 114 interfacing an example approval module. The process begins with the retrieval module 114 receiving a prompt from the class building module 108, at step 500. The prompt from the class building module 108 will include the course for which data is being retrieved. Data related to that course may then be retrieved from the parsing database 118, at step 502. Course materials uploaded by the teacher, such as textbooks, quizzes, instructional videos, may then be retrieved from the course database 104, at step 504. For each retrieved course segment, course materials or portions of course materials are matched at step 506. For example, a syllabus for a geometry course may be uploaded to the system along with a textbook. The retrieval module 114 identifies a chapter in the textbook on supplementary and complementary angles as a potential match with the course segment on the classification of angles. This matching may be done with a Gaussian function which takes general density distribution as an input parameter.

$$p(x_i|D_{dist}) = a * e^{\left(\frac{-D_{dist}}{2^{b^2}}\right)}$$

In which a and b are hyper-parameters.

To measure how well the text of the course segment fits into an assigned cluster by averaging the similarity between the course segment text and all the text that belongs to a cluster in the course materials. Matches above a similarity threshold are written to the course database 104, at step 508.

One or more third party network 120 may then be queried for matches to one or more of the identified course segments, topic, sub-topics, or sub-sub-topics. For example, the retrieval module 114 may query YouTube.com for videos whose description text is above the similarity threshold compared to the course segment text. This matching may be done with a Gaussian function that takes general density distribution as input parameter to measure how well text of the course segment fits into an assigned cluster by averaging the similarity between the video description text and all the text that belongs to a cluster in the video description text. These steps may be repeated until all course segments have supporting material from the course database 104 or a third party network 120. Once no more matches can be found, the process returns to the class building module 108.

In some cases, generative content may be added based on the matched course material. A generative machine-learning model trained on a dataset of matched course segments and additional contextual material and configured to generate the additional contextual material based on the provided input. The generative model may utilize a neural network architecture trained through supervised learning techniques to understand and reproduce patterns within the matched course material. The additional contextual material may be generated in a manner consistent with the style, theme, and context of the provided matched course material, thereby enhancing the coherence and relevance of the generated content. For example, if the matched course material is at an $8^{th}$ grade comprehension level, the additional contextual material should be at an $8^{th}$ grade comprehension level as well. In some cases, additional sub-topics may be generated by the generative model as suggestions to be added to the syllabus.

In some cases, the process may proceed to the approval module 116 by launching the approval module 116 at step 210. In some cases, the approval module 116 approves the parsed course segments as well as the matched course material content. As such, the approval module 116 may proceed to determine whether there are matched course material content that the teacher has not yet approved at step 410. The supporting materials may be matched with course segments by the retrieval module 114. The teacher may then either approve or disapprove the matched course material content. If the teacher approves of one matched course material content and there are more matched course material content, the teacher may continue to approve or disapprove the matched course material content, until there are no more and ending the program at step 212. If the teacher does not approve the matched course material content, they may elect to edit or delete the segment or matched course material at step 412, and the edits may be written to the course database 104. Furthermore, the matching machine-learning model may be retrained based on the received objection in step 414.

Figure 6:
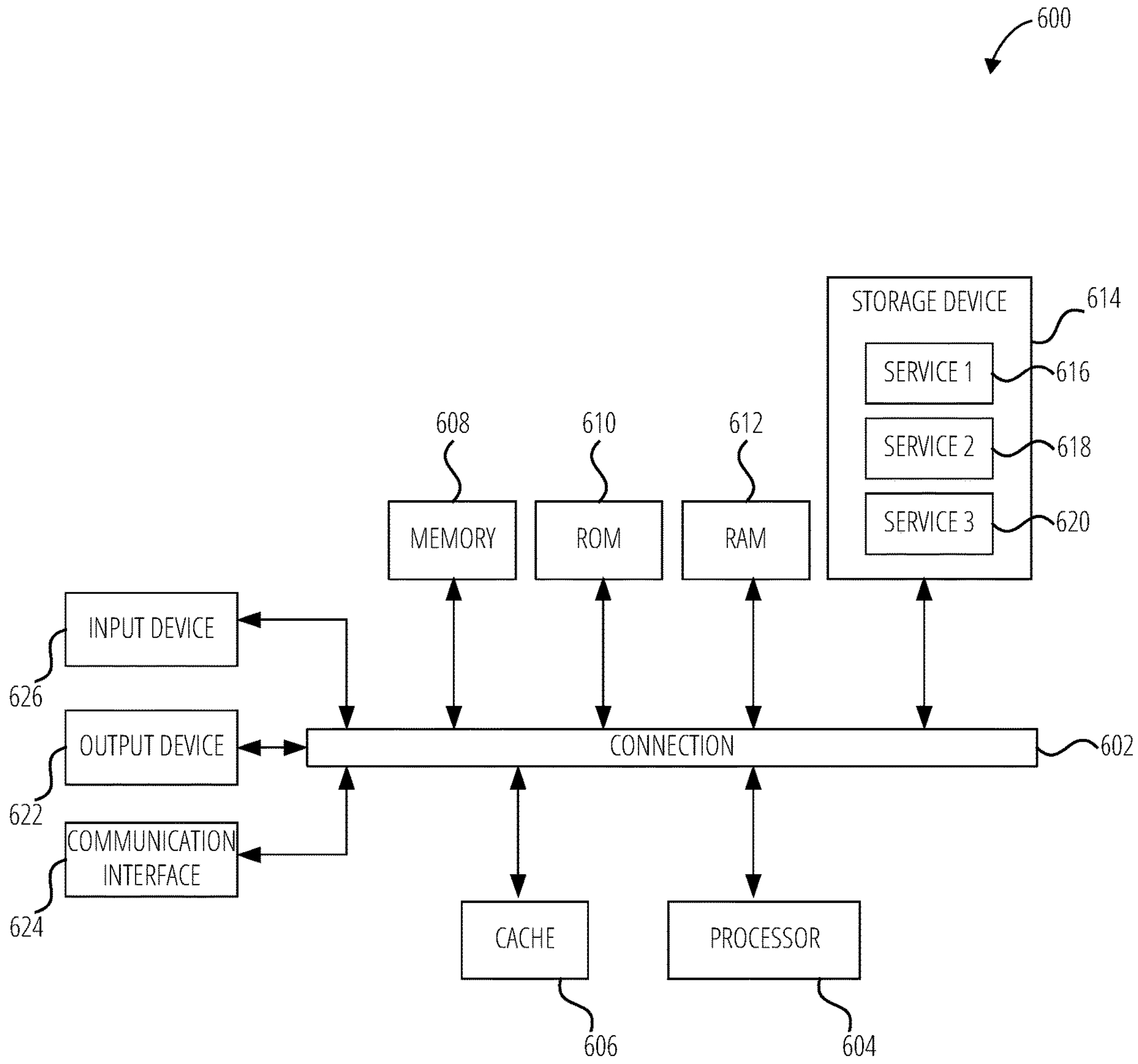
FIG. 6 illustrates an example of computing system.

FIG. 6 shows an example of computing system 600, which can be for example any computing device making up education network 102, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 608 connected directly with, in close proximity to, or integrated as part of processor 604.

Processor 604 can include any general purpose processor and a hardware service or software service, such as services 606, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 7:
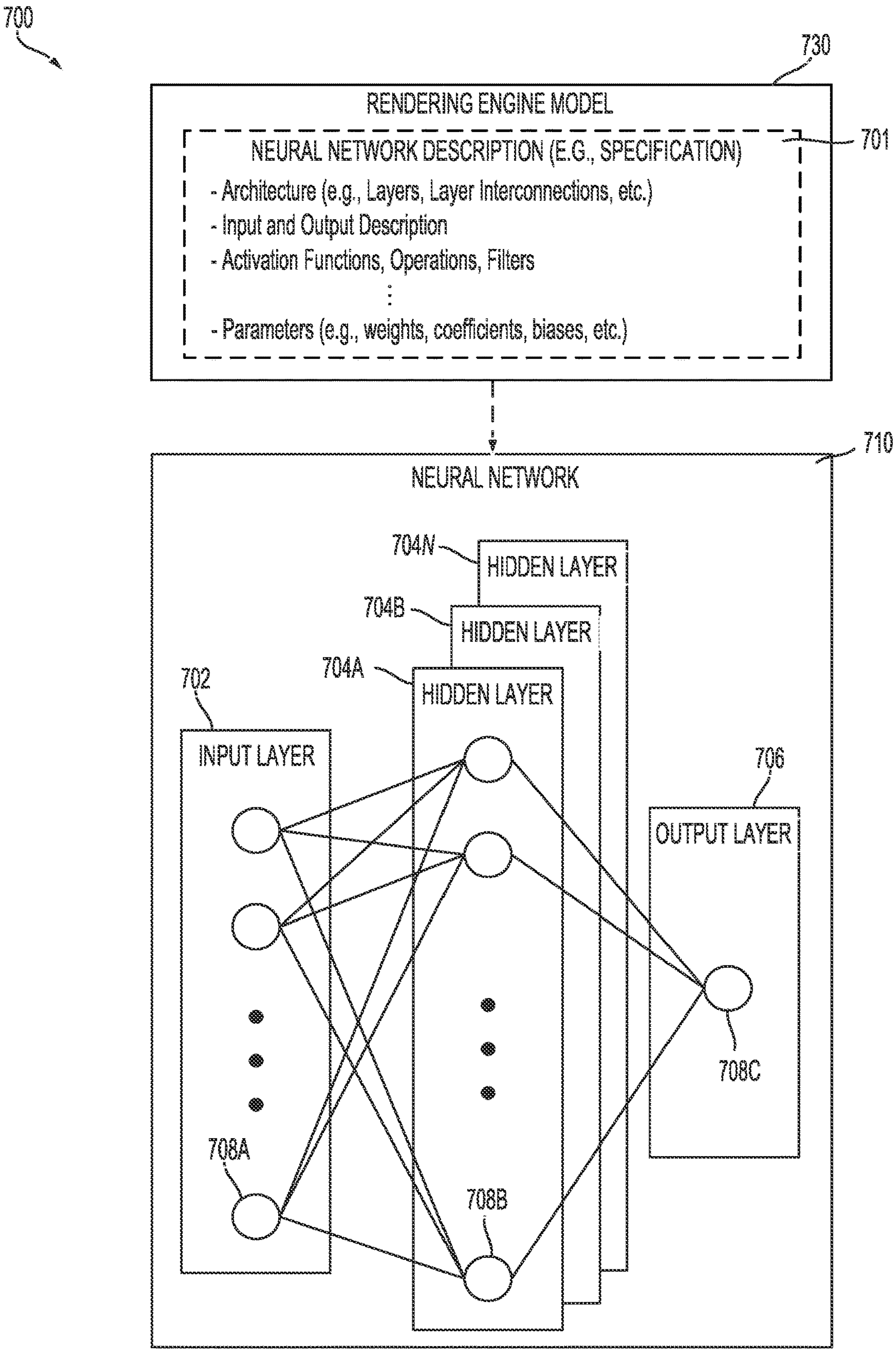
FIG. 7 illustrates an example neural network architecture.

FIG. 7 illustrates an example neural network architecture. Architecture 700 includes a neural network 710 defined by an example neural network description 701 in rendering engine model (neural controller) 730. The neural network 710 can represent a neural network implementation of a rendering engine for rendering media data. The neural network description 701 can include a full specification of the neural network 710, including the neural network architecture 700. For example, the neural network description 701 can include a description or specification of the architecture 700 of the neural network 710 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 710 reflects the architecture 700 defined in the neural network description 701. In this example, the neural network 710 includes an input layer 702, which includes input data, such as a syllabus and course material content. In one illustrative example, the input layer 702 can include data representing a portion of the input media data such as a patch of data or pixels (e.g., a 128×128 patch of data) in an image corresponding to the input media data (e.g., a syllabus or course material content).

The neural network 710 includes hidden layers 704A through 704 N (collectively "704" hereinafter). The hidden layers 704 can include n number of hidden layers, where n is an integer greater than or equal to one. The number of hidden layers can include as many layers as needed for a desired processing outcome and/or rendering intent. The neural network 710 further includes an output layer 706 that provides an output (e.g., course segments from the syllabus and matching course material content) resulting from the processing performed by the hidden layers 704. In one illustrative example, the output layer 706 can provide an identification of course segments from the syllabus and matching course material content.

The neural network 710 in this example is a multi-layer neural network of interconnected nodes. Each node can represent a piece of information. Information associated with the nodes is shared among the different layers and each layer retains information as information is processed. In some cases, the neural network 710 can include a feed-forward neural network, in which case there are no feedback connections where outputs of the neural network are fed back into itself. In other cases, the neural network 710 can include a recurrent neural network, which can have loops that allow information to be carried across nodes while reading in input.

Information can be exchanged between nodes through node-to-node interconnections between the various layers. Nodes of the input layer 702 can activate a set of nodes in the first hidden layer 704A. For example, as shown, each of the input nodes of the input layer 702 is connected to each of the nodes of the first hidden layer 704A. The nodes of the hidden layer 704A can transform the information of each input node by applying activation functions to the information. The information derived from the transformation can then be passed to and can activate the nodes of the next hidden layer (e.g., 704B), which can perform their own designated functions. Example functions include convolutional, up-sampling, data transformation, pooling, and/or any other suitable functions. The output of the hidden layer (e.g., 704B) can then activate nodes of the next hidden layer (e.g., 704 N), and so on. The output of the last hidden layer can activate one or more nodes of the output layer 706, at which point an output is provided. In some cases, while nodes (e.g., nodes 708A, 708B, 708C) in the neural network 710 are shown as having multiple output lines, a node has a single output and all lines shown as being output from a node represent the same output value.

In some cases, each node or interconnection between nodes can have a weight that is a set of parameters derived from training the neural network 710. For example, an interconnection between nodes can represent a piece of information learned about the interconnected nodes. The interconnection can have a numeric weight that can be tuned (e.g., based on a training dataset), allowing the neural network 710 to be adaptive to inputs and able to learn as more data is processed.

The neural network 710 can be pre-trained to process the features from the data in the input layer 702 using the different hidden layers 704 in order to provide the output through the output layer 706. In an example in which the neural network 710 is used to identify course segments from the syllabus and match course material content, the neural network 710 can be trained using training data that includes example images and facial features of user 702 and/or labeling and characteristic information (e.g., name, brand, size, etc.) of product(s) 708. For instance, training images can be input into the neural network 710, which can be processed by the neural network 710 to generate outputs which can be used to tune one or more aspects of the neural network 710, such as weights, biases, etc.

In some cases, the neural network 710 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 710, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 710 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 710 can perform a backward pass by determining which inputs (weights) most contributed to the loss of the neural network 710, and can adjust the weights so that the loss decreases and is eventually minimized.

A derivative of the loss with respect to the weights can be computed to determine the weights that contributed most to the loss of the neural network 710. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 710 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 710 can represent any other neural or deep learning network, such as an autoencoder, a deep belief nets (DBNs), a recurrent neural networks (RNNs), etc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method of creating a custom online course based on matching content with a course syllabus comprising:
- receiving an electronic course syllabus document having a first organizational outline;
- applying an optical character recognition (OCR) machine-learning model adapted from rule-based text classification to extract and parse the electronic course syllabus document into at least two course segments of the first organizational outline, wherein the OCR machine-learning model determines first weights based on parsed training data including parsed course segment text associated with determined course segments;
- receiving at least one supporting course material content having a second organizational outline;
- applying a matching machine-learning model to match course material content with one or more course segments of the at least two course segments, wherein the matching machine-learning model determines second weights based on matched training data including the determined course segments and matched course material content, and wherein the matched course material content is in a different order than the second organizational outline;
- presenting the course segments and the matched course material content for approval; and
- generating a custom online course with the approved course segments and the matched course material.

2. The method of claim 1, further comprising:
- receiving an objection to the parsed course segments; and
- retraining the OCR machine-learning model based on the received objection, wherein the OCR machine-learning model adjusts the first weights to align with the received objection.

3. The method of claim 1, further comprising:
- receiving an objection to the presented course segments and the presented matched course material content; and
- retraining the OCR machine-learning model based on the received objection, wherein the OCR machine-learning model adjusts the second weights to align with the received objection.

4. The method of claim 1, wherein the OCR machine-learning model parses the electronic course syllabus document using a multi-pass sieve framework including a word finding stage, a line finding stage, and a character classification stage.

5. The method of claim 4, wherein the OCR machine-learning model incorporates a long-short-term memory (LSTM) network over the multi-pass sieve framework, wherein the LSTM network learns long term dependencies between the word finding stage, the line finding stage, and the character classification stage.

6. The method of claim 1, wherein the matching machine-learning model matches above a similarity threshold between the course material content and each of the one or more course segments with a Gaussian function which takes general density distribution as an input parameter to measure how well text of the course material content fits into an assigned cluster by averaging similarity between the text and all other text that belongs to a cluster associated with a respective course segment.

7. The method of claim 1, further comprising:
- generating, by a generative machine-learning model, additional contextual material or additional sub-topics based on the determined course segments or the matched course material content.

8. The method of claim 7, wherein the course material content is matched with a Gaussian function that takes general density distribution as input parameter to measure how well text of the respective course segment fits into an assigned cluster by averaging a similarity between a video description text and all the text that belongs to a cluster in the video description text.

9. A system of creating a custom online course based on matching content with a course syllabus, the system comprising:
- memory that stores an optical character recognition (OCR) machine-learning model and a matching machine-learning model;
- a communication interface that communicates over a communication network with a user device, wherein the communication interface communicates to receive an electronic course syllabus document having a first organizational outline; and
- a processor that executes instructions stored in memory, wherein the processor executes the instructions to:
  - apply the optical character recognition (OCR) machine-learning model adapted from rule-based text classification to extract and parse the electronic course syllabus document into at least two course segments of the first organizational outline that are classified through a multi-pass sieve framework, wherein the OCR machine-learning model determines first weights based on parsed training data including parsed course segment text associated with determined course segments;
  - receive at least one supporting course material content having a second organizational outline;
  - apply the matching machine-learning model to match course material content with one or more course segments of the at least two course segments, wherein the matching machine-learning model determines second weights based on matched training data including the determined course segments and matched course material content, and wherein the matched course material content is in a different order than the second organizational outline;
  - present the course segments and the matched course material content for approval; and
  - generate a custom online course with the approved course segments and the matched course material.

10. The system of claim 9, wherein the processor further executes the instructions to:
- receive an objection to the parsed course segments; and
- retrain the OCR machine-learning model based on the received objection, wherein the OCR machine-learning model adjusts the first weights to align with the received objection.

11. The system of claim 9, wherein the processor further executes the instructions to:
- receive an objection to the presented course segments and the presented matched course material content; and
- retrain the OCR machine-learning model based on the received objection, wherein the OCR machine-learning model adjusts the second weights to align with the received objection.

12. The system of claim 9, wherein the OCR machine-learning model parses the electronic course syllabus document using a multi-pass sieve framework including a word finding stage, a line finding stage, and a character classification stage.

13. The system of claim 12, wherein the OCR machine-learning model incorporates a long-short-term memory (LSTM) network over the multi-pass sieve framework, wherein the LSTM network learns long term dependencies between the word finding stage, the line finding stage, and the character classification stage.

14. The system of claim 9, wherein the matching machine-learning model matches above a similarity threshold between the course material content and each of the one or more course segments with a Gaussian function which takes general density distribution as an input parameter to measure how well text of the course material content fits into an assigned cluster by averaging similarity between the text and all other text that belongs to a cluster associated with a respective course segment.

15. The system of claim 9, wherein the course material content is a video retrieved through a third-party network.

16. The system of claim 15, wherein the course material content is matched with a Gaussian function that takes general density distribution as input parameter to measure how well text of the respective course segment fits into an assigned cluster by averaging a similarity between a video description text and all the text that belongs to a cluster in the video description text.

17. A non-transitory, computer-readable storage medium, having embodied thereon instructions executable by a computing system to perform a method for creating a custom online course based on matching content with a course syllabus, the method comprising:

receiving an electronic course syllabus document having a first organizational outline;

using an optical character recognition (OCR) machine-learning model adapted from rule-based text classification to extract and parse the electronic course syllabus document into at least two course segments of the first organizational outline that are classified through a multi-pass sieve framework, wherein the OCR machine-learning model determines first weights based on parsed training data including parsed course segment text associated with determined course segments;

receiving at least one supporting course material content having a second organizational outline;

using a matching machine-learning model to match course material content with one or more course segments of the at least two course segments, wherein the matching machine-learning model determines second weights based on matched training data including the determined course segments and matched course material content, and wherein the matched course material content is in a different order than the second organizational outline;

presenting the course segments and the matched course material content for approval; and generating a custom online course with the approved course segments and the matched course material.

18. The non-transitory, computer-readable storage medium of claim 17, the method further comprising:

receiving an objection to the parsed course segments; and retraining the OCR machine-learning model based on the received objection, wherein the OCR machine-learning model adjusts the weights to align with the received objection.

19. The non-transitory, computer-readable storage medium of claim 17, the method further comprising:

receiving an objection to the presented course segments and the presented matched course material content; and retraining the OCR machine-learning model based on the received objection, wherein the OCR machine-learning model adjusts the weights to align with the received objection.

20. The non-transitory, computer-readable storage medium of claim 17, wherein the OCR machine-learning model parses the electronic course syllabus document using a multi-pass sieve framework including a word finding stage, a line finding stage, and a character classification stage.

* * * * *